(12) United States Patent
Asobayire et al.

(10) Patent No.: US 7,103,591 B2
(45) Date of Patent: Sep. 5, 2006

(54) METHOD OF DESCRIBING BUSINESS AND TECHNOLOGY INFORMATION FOR UTILIZATION

(75) Inventors: Paul Asobayire, Jersey City, NJ (US);
Dilip K. Barman, Durham, NC (US);
Stephen E. Bello, Austin, TX (US);
Anne E. Bomford, Sherman, CT (US);
Ting D. Cheng, Mahopac, NY (US);
Thomas E. Donegan, Sewickley, PA (US); John O. F. Long, Raleigh, NC (US); R. Bruce Shearer, Charlotte, NC (US)

(73) Assignee: International Business Machines Corporation, Aronmonk, NY (US)

( * ) Notice: Subject to any disclaimer, the term of this patent is extended or adjusted under 35 U.S.C. 154(b) by 433 days.

(21) Appl. No.: 10/308,376

(22) Filed: Dec. 2, 2002

(65) Prior Publication Data
US 2004/0107187 A1   Jun. 3, 2004

(51) Int. Cl.
*G06F 17/30* (2006.01)
(52) U.S. Cl. ............................................. 707/3; 707/3
(58) Field of Classification Search ................ 707/3–5, 707/104.1
See application file for complete search history.

(56) References Cited

U.S. PATENT DOCUMENTS

| | | | |
|---|---|---|---|
| 4,974,149 A | 11/1990 | Valenti ........................ 364/200 |
| 5,504,814 A | 4/1996 | Miyahara ........................ 380/4 |
| 5,819,288 A * | 10/1998 | De Bonet ....................... 707/2 |
| 6,055,364 A * | 4/2000 | Speakman et al. ........... 709/229 |
| 6,073,129 A | 6/2000 | Levine et al. ................... 707/4 |
| 6,125,395 A | 9/2000 | Rosenberg et al. .......... 709/228 |
| 6,182,068 B1 * | 1/2001 | Culliss ........................... 707/5 |
| 6,192,357 B1 | 2/2001 | Krychniak |
| 6,226,719 B1 * | 5/2001 | Minow ......................... 711/154 |
| 6,490,370 B1 * | 12/2002 | Krasinski et al. ............ 382/195 |
| 6,609,123 B1 * | 8/2003 | Cazemier et al. ............... 707/4 |
| 6,629,097 B1 * | 9/2003 | Keith ............................. 707/5 |
| 6,803,919 B1 * | 10/2004 | Kim et al. .................... 345/582 |
| 2002/0099721 A1 * | 7/2002 | Ganapathy et al. ....... 707/104.1 |
| 2002/0184622 A1 | 12/2002 | Emura et al. |
| 2003/0061610 A1 * | 3/2003 | Errico .......................... 725/46 |
| 2003/0084053 A1 * | 5/2003 | Govrin et al. ............... 707/100 |
| 2004/0085363 A1 * | 5/2004 | Lawrence .................... 345/802 |
| 2004/0107088 A1 * | 6/2004 | Budzinski .................... 704/10 |
| 2004/0111408 A1 * | 6/2004 | Caudill et al. ................. 707/3 |
| 2004/0177088 A1 * | 9/2004 | Jeffrey ........................ 707/102 |

\* cited by examiner

*Primary Examiner*—Uyen Le
*Assistant Examiner*—Hanh Thai
(74) *Attorney, Agent, or Firm*—Akerman Senterfitt

(57) ABSTRACT

A method for data processing can include associating at least one descriptor dimension with a data item. The descriptor dimension can represent a scale between a first subject and at least a second subject. A dimension value can be associated with the descriptor dimension to quantify a relationship between the data item and the first and second subjects.

30 Claims, 2 Drawing Sheets

100

| Descriptor Dimension | Dim. Value |
|---|---|
| Business v. Technology | 3 |
| Front-end v. Back-end | 1 |
| Global v. Local | 3 |
| Mass usrs v. Selected srs | 2 |
| Concept v. Implementation | 2 |
| Strategy v. Execution | 1 |
| Planning v. Operation | 3 |
| Cost v. Revenue Focused | 2 |
| Generic v. Specific | 3 |
| Consolidated v. Distributed | 1 |
| Data v. Programming Centric | 2 |
| Broad v. Domain/Vert. View | 2 |

100

| Descriptor Dimension | Dim. Value |
|---|---|
| Business v. Technology | 3 |
| Front-end v. Back-end | 1 |
| Global v. Local | 3 |
| Mass usrs v. Selected srs | 2 |
| Concept v. Implementation | 2 |
| Strategy v. Execution | 1 |
| Planning v. Operation | 3 |
| Cost v. Revenue Focused | 2 |
| Generic v. Specific | 3 |
| Consolidated v. Distributed | 1 |
| Data v. Programming Centric | 2 |
| Broad v. Domain/Vert. View | 2 |

| History Descriptor | |
|---|---|
| Share | Database |
| Usage | Database |
| Modified | 8/26/2001 |
| Last used | 12/1/2001 |
| No. of times used | 129 |

| Ownership Descriptor | |
|---|---|
| Owner | Group 1 |
| Author | Joe Smith |
| Creator | Jane Doe |

| Characteristics |
|---|
| Internal use only |
| ERP |
| BI |
| Supply Chain Management |
| CRM |
| Web Enabling Technology |
| DBM or Data Warehouse |
| Integration Hub or Workflow Man |
| Security |
| System Management Technology |
| Platforms, Netwrk or Com Sys |
| Middleware or tools |
| Usr Intrface/Chnl/T Point Man |
| Data or Messaging |
| Storage, I/O Sys, SAN or Perip |
| Pervasive Computing Tech |
| Knowledge or Collab Man |
| Consulting & Services |
| Scalability or Availability |
| Bus Proc Reeng/Decomp/Model |
| Organizations or Roles |
| Use Case |
| Scenario |
| Business Domain |
| Info Model or Application |
| Arch, Infrastructure or Frame |
| Deployment of Services |
| Sales/market or Marketing |
| Service, Support or Consulting |
| Strategy |
| Trends |
| Value |

FIG. 1B

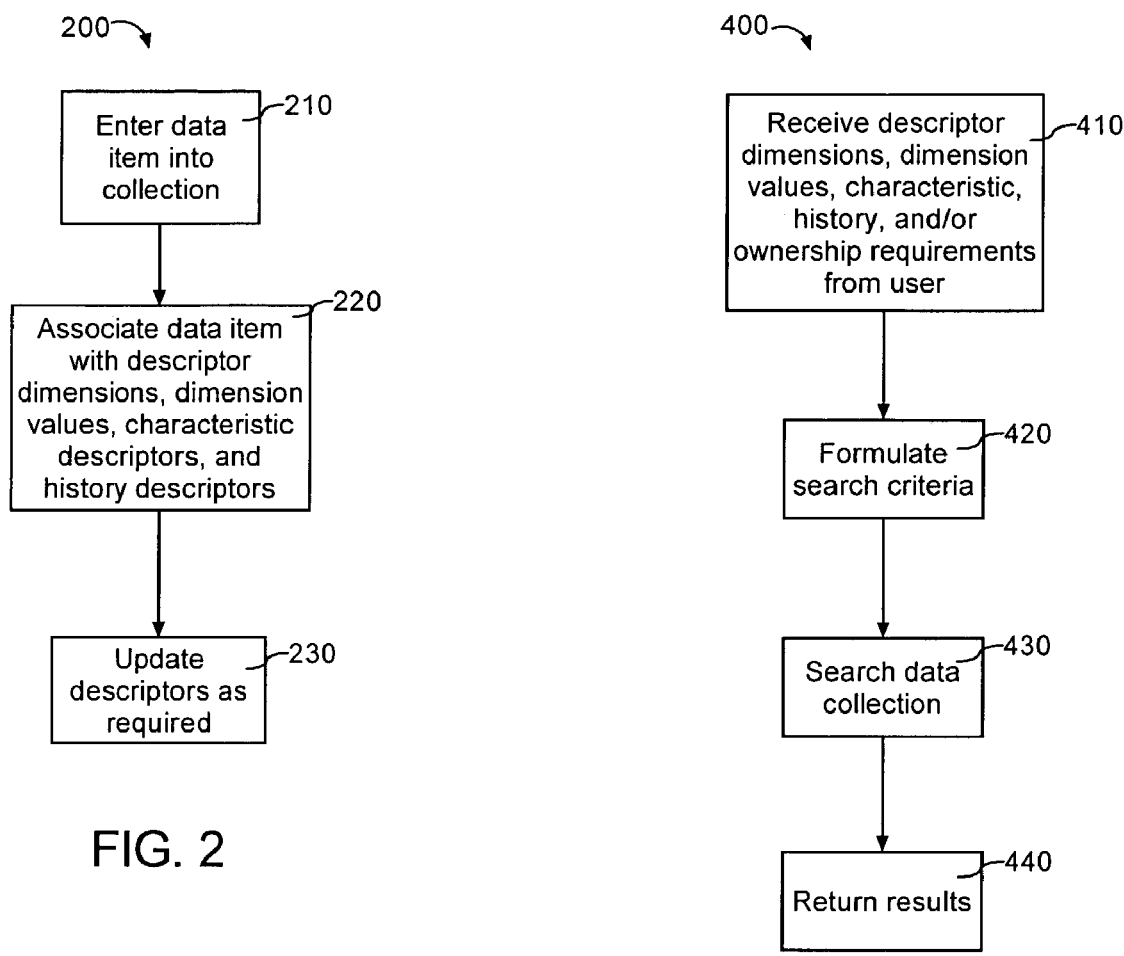
FIG. 2
FIG. 4
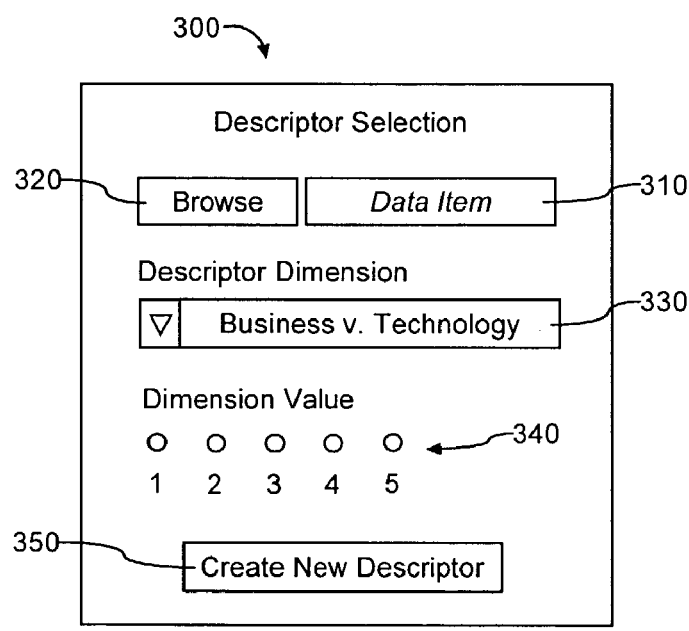
FIG. 3

METHOD OF DESCRIBING BUSINESS AND TECHNOLOGY INFORMATION FOR UTILIZATION

BACKGROUND OF THE INVENTION

1. Technical Field

This invention relates to the field of data processing, and more particularly, to a method of describing information for retrieval and utilization.

2. Description of the Related Art

Conventional search engines allow users to locate data items matching particular search criteria from within a collection of data items. Typically, a search engine matches a user specified query against an index of descriptors. Descriptors, sometimes referred to as metadata, provide a definition or description of data. Descriptors can be associated with data items, and thus, can be used to provide a searchable description for the data items with which the descriptors are associated. For example, the descriptors can be associated with various types of data items such as hardware profiles, data entries, multimedia files, documents, drawings, charts, spreadsheets, software objects, records, Web sites, Web pages, or any other electronic document and/or software component which may be part of a searchable collection.

Data items can be associated with numerous descriptors. Similarly, each descriptor can be associated with numerous data items. Descriptors commonly are specified as a single word or phrase. A single word or phrase, however, often does not relay the essence or provide a complete description of a data item. Associating the data item with more than one descriptor may not convey the degree to which the data item is related to each individual descriptor. In consequence, searching a data collection for data items matching the a particular set of characteristics can be challenging.

User specified queries typically employ selected keywords as search terms. The search terms can be weighted thereby placing more emphasis on particular search terms. Some search techniques implicitly weight search terms by assigning significance based upon the position of the term within a user query. For example, the first term specified in the user query can be assigned the highest significance while the last term of the query may be assigned the lowest significance. Other search techniques allow the user to directly specify the weight of search terms.

Research has shown, however, that users are not particularly skilled at determining the relative importance of query terms. One reason is that users frequently are not aware of the variety of descriptors which exist, or at least the extent of descriptors available, within a given document collection. Further, as most users seek information about unfamiliar subjects, users are likely to be unfamiliar with the terminology most suited and/or most often used in reference to the subject matter being searched. Hence, users may place great weight on terms which are irrelevant, and place little weight on terms which are highly relevant.

SUMMARY OF THE INVENTION

The invention disclosed herein provides a solution for describing, searching, and administering data collections. Several sets of descriptors can be used for describing the potential usage of data items, the characteristics or content of data items, as well as the usage and operational histories of data items. Each of the various descriptor sets can be used to search and index collections of data items. The history descriptors, however, also can be used to administer data items.

One aspect of the invention can include a method for data processing. The method can include associating one or more descriptor dimensions to data items of a collection. Each of the descriptor dimensions can represent a scale between at least a first subject and a second subject. The subjects can relate to potential uses of the data item. According to one embodiment, the first and second subjects can be opposites of one another. A dimension value can be assigned to the descriptor dimension. The dimension value can quantify a relationship of the data items to the first and second subjects of the descriptor dimension. Notably, the descriptor dimensions and dimension values can be determined by querying a user with a set of questions wherein the questions correlate to the descriptor dimensions and dimension values associated with the data items.

The method also can include assigning a characteristic descriptor to one or more of the data items. The characteristic descriptor can specify a function of the data items or what the data item is, for example an audio segment, a video segment, or the like. A history descriptor also can be assigned to one or more of the data items. The history descriptor can specify a usage history, a sharing history, a replication history, and/or a modification history. The history descriptor further can specify an owner of the data item. Accordingly, the descriptors disclosed herein can be used by a search engine to select data items in response to a user query.

Another aspect of the present invention can include a method for searching a collection of data items. The method can include querying a user with a set of questions. The questions can correlate to descriptor dimensions and dimension values associated with the data items. The descriptor dimensions can represent a scale between at least a first subject and a second subject; and, the dimension values can quantify a relationship of the data items to the first and second subjects of the descriptor dimension. A query can be generated based upon user responses to the questions. The query can specify one or more descriptor dimensions and associated dimension values for searching the collection of data items. The collection of data items can be searched for particular ones of the data items conforming to the query.

Notably, the generating step can include determining one or more history descriptors and/or characteristic descriptors for the data items to be used in the query. Accordingly, the searching step can include searching the collection of data items using at least one of the history descriptors and/or the characteristic descriptors.

BRIEF DESCRIPTION OF THE DRAWINGS

There are shown in the drawings embodiments which are presently preferred it being understood, however, that the invention is not limited to the precise arrangements and instrumentalities shown.

FIG. 1A is a table listing descriptor dimensions for describing data items within a data collection in accordance with the present invention.

FIG. 1B is a table listing characteristic descriptors for describing data items within a data collection in accordance with the present invention.

FIG. 1C is a table listing history descriptors for describing data items within a data collection in accordance with the present invention.

FIG. 1D is a table listing additional history descriptors for describing data items within a data collection in accordance with the present invention.

FIG. 2 is a flow chart illustrating a method of associating a data item with descriptors in accordance with the present invention.

FIG. 3 is an exemplary graphical user interface for associating data items with descriptors in accordance with the present invention.

FIG. 4 is a flow chart illustrating a method of searching a data collection in accordance with the present invention.

DETAILED DESCRIPTION OF THE INVENTION

The invention disclosed herein provides a solution for describing, searching, and administering data items within a collection. Several sets of descriptors can be used for describing the potential usage of data items, the characteristics or content of data items, as well as the usage and operational histories of data items. Each of the various descriptors can be used for purposes of searching and indexing data items. The history descriptors can be to administer data items. As used herein, the term "data items" can include hardware profiles, data entries, multimedia files, documents, drawings, charts, spreadsheets, software objects, records, Web sites, Web pages, or any other electronic documents, programming models, data models, software components, or information items which may be part of a searchable collection.

One set of descriptors that can be provided for data items in a collection is a dimension with a dimension value, as shown in table 100 of FIG. 1A. The descriptor dimension and dimension value can be used to detail the potential usage or conditions under which a data item is to be used. The descriptor dimensions represent a scale between two different subjects, topics, uses, and/or classifications. According to one embodiment of the present invention, the two ends of the scale can be opposites of one another.

For example potential uses for a data item such as promotional or engagement material can be specified as "global v. local." That is the data item can be designated for use with local customers and/or global customers. A dimension value 120 can be provided to quantify a relationship of the data item to the subjects of the descriptor dimension. In particular, the dimension value can quantify a location within the scale indicating a relative percentage or measure of the relevance of the data item to each end of the scale. Taking the previous example, the dimension value can indicate whether the promotional materials are more related, or more likely, to be used in a global context, a local context, or are equally applicable to both global and local uses.

The dimension value can be based on a sequential number system, a sequential alphabet system, or any other symbol system capable of describing the ordering of items. For example, if dimension values from 1 to 5 are used with the descriptor dimension, then any data item having a dimension value of 3 for a particular descriptor dimension can be equally applicable or relevant to each subject represented by the descriptor dimension. A dimension value of 1 or 5 can mean that the data item is primarily for use with one subject or the other. For example, a dimension value of 1 associated with the descriptor dimension "global v. local" can indicate that a data item is completely global in nature. A dimension value of 5 used with the descriptor dimension "global v. local" can indicate that the data item is completely local in nature. By comparison, a dimension value of 2 can indicate that the data item is primarily global in nature.

It should be appreciated that the descriptor dimensions can represent more than two subjects. In particular, a descriptor dimension can represent three, four, or more different subjects. For example, the value associated with the descriptor dimension can be specified as a location on a grid where the locations are sequentially numbered. A descriptor dimension can be visually represented as a square having four different subjects wherein each subject is represented by a side of the square. The area of the square can be subdivided into 9 or more sequentially number blocks such that a single value can indicate the relationship of a designated data item to each of the four subjects. Still, the invention is not limited to representing multi-dimensional descriptors in any particular format. For example, a value associated with a multi-dimensional descriptor can be represented as a vector.

Referring to table 130 of FIG. 1B, characteristic descriptors can be provided. The characteristic descriptors can be used to describe or indicate the content of data items. Thus, the characteristic descriptors provide a description of the functionality of a data item and what the data item actually is. For example, a characteristic descriptor can describe a data item as being optimized for internal use, as being an object of a database system, an audio segment, or having any other configurable characteristic. That is, a system administrator can determine one or more characteristics of a given domain to which a data item can be related.

History descriptors can represent the operational life cycle and history of usage of a data item as shown in table 150 of FIG. 1C. Accordingly, a data item collection can be searched for selected historical parameters represented by particular subsets of history descriptors. For example, a "sharing" history descriptor can indicate data items that have been shared with different applications. For instance, a particular document such as an Extensible Markup Language (XML) document can be accessed by one or more applications such as database applications and/or browsers. This information can be noted by the "sharing" history descriptor. A "replication" history descriptor can indicate whether a data item was replicated, by whom, and when, for exmaple.

A usage history descriptor can describe a historical usage for a data item. For example, a download history can be provided which includes the frequency that a particular data item is downloaded, dates and times of particular download instances, particular applications used to retrieve an entity, the identity of users having accessed the data item, and other information related to download history. Similarly, the number of times a software object is viewed, when, and by whom also can be specified with the usage descriptor.

A modification history descriptor can be provided to describe the historical changes to a data item. As a data item may be modified more than once, a single modification history descriptor can indicate the complete history of modifications to the data item. Alternatively, a plurality of modification history descriptors can be associated with a data item wherein each descriptor represents a single instance of a modification. Notably, the descriptors can include references or point to prior versions of data items thereby allowing the tracking of previous versions of a data item.

Referring to table 180 of FIG. 1D, another type of history descriptor can include ownership descriptors 190. An ownership descriptor can describe the creator, author, and/or owners of a data item. For example, an ownership descriptor can associate a current owner with a data item, that is, the person and/or organization responsible for maintaining the data item. The ownership descriptors further can specify the creator and any past owners of a data item. The ownership descriptor further can specify dates when ownership of a particular data item changed. Still, the examples disclosed herein should not be construed as a limitation of the present invention.

In any case, the descriptor dimensions and dimension values, the history descriptors, and the characteristic descriptors can be used to search and/or index a collection of data items. The history descriptors can be used to administer a collection of data items.

FIG. 2 is a flow chart 200 illustrating a method for associating a data item with descriptors in accordance with the present invention. Referring to step 210, a data item can be entered into a collection. For example, a software object can be created and stored in a library, a record can be entered into a data table, a hardware profile can be added to an existing system, and/or a Web page or Web site can be added to a network.

Referring to step 220, the data item can be associated with a variety of descriptors. The association of data items with descriptors can be performed manually by one or more administrative personnel or in a semi-automatic fashion using an appropriate tool. The data item can be assigned one or more applicable descriptor dimensions and applicable dimension values. Characteristic descriptors and history descriptors can be associated with the data item as well. Referring to step 230, the descriptors associated with the data item can be updated or added as required. For example when the data item is modified, descriptors tracking changes to the data item can be created or updated to note the date the data item was modified, who modified the data item, the changes made to the data item, and where previous versions of the data item are stored.

A graphical user interface (GUI) can be used to associate the data items of a collection with the various descriptors disclosed herein. For instance, when a data item is entered into a collection, a GUI 300, which can be included as part of a data descriptor tool, can be presented to an administrator or user. The GUI 300 can provide a standard list of descriptors from which the user can select to associate the descriptors with a selected data item. The GUI 300 can incorporate a data item selector field 310 and a "Browse" activatable icon 320 for choosing a data item with which a descriptor is to be associated. To choose the data item, the user can enter a file name or address into the selector field 310 or browse through directories by activating a search tree with the "Browse" icon 320. A descriptor can be associated with the data item by selecting the descriptor from a pull down menu 330 linked to a listing or table of descriptors.

If the descriptor is of the dimension type, the dimension portion of the descriptor can be selected with the pull down menu 330. Radio buttons 340 can be provided to facilitate user selection of a dimension value to be associated with the dimension. Although a scale of 1–5 is shown in FIG. 3, it should be appreciated that the range can be larger or smaller as may be desired to reflect the relevance of data items to the various subjects of a given descriptor dimension. In the event that the descriptor selected is not a dimension type, the radio buttons 340 can be hidden or disabled. Descriptors such as characteristic and history descriptors can be associated with the selected data item as well. In any case, one or more of each type of descriptor can be associated with a given data item. For example, an activatable icon can be provided in the GUI 300 to select the additional descriptors and associate the additional descriptors with the selected data item. The descriptor data, including descriptor dimensions and dimension values when applicable, can be stored to a data storage such as a table, text file, and/or relational database.

A "Create New Descriptor" activatable icon 350 can be provided in the GUI 300 to initiate the creation of new or custom descriptors. For example, a new GUI can be presented for inputting descriptor information when a user selects the "Create New Descriptor" activatable icon 350. Hence, if the user feels that a custom descriptor would more accurately describe a particular data item, such a descriptor can be created. The user also can be presented with the option of making the newly created descriptor available for use with other data items. For example, the newly created descriptor can be added to a default list of descriptors.

Still, a variety of other GUI formats and styles can be used, as would be known to the skilled artisan. Accordingly, the various GUIs disclosed herein are provided for purposes of illustration only and should not be construed as a limitation of the present invention. For example, a GUI can be used to update descriptors. According to one embodiment of the present invention, a user can be presented with the option of viewing all descriptors associated with a particular data item and selecting descriptors to update and/or edit. The descriptor information to be updated can be presented in such as way as to facilitate user edits to the selected information. Descriptors also can be automatically updated as the history of a data item changes, for example, when the data item is used or shared with an application, accessed by a user, and/or when the content of the data item is changed.

FIG. 4 is a flow chart 400 illustrating a method for receiving search parameters from a user for searching a data collection in accordance with the present invention. Referring to step 410, user information can be entered into a user interface from which a search query can be constructed. Importantly, the user interface can present the user with a series of questions to identify likely search parameters relating to descriptor dimensions and dimension values, characteristics, and/or history requirements. For example, yes/no questions and/or natural language processing techniques can be used.

The following is an exemplary question which can be presented to a user: "Is it true that the presentation you are preparing is for the CEO and line of business executives of a company that deals with mass marketing?" If the user answers "yes" to the question, the search criteria generated from the question can specify that data items having descriptor dimensions of "business v. technology" and "mass users v. selected users" having a dimension value of 1 are to be located. Additional questions can be formulated to elicit responses indicating other descriptor dimensions, dimension values, characteristic, and history descriptors from the user, as well as any other type of descriptors associated with the entities of the searchable collection. For example, the questions can be organized as a hierarchically ordered decision tree where user responses to prior questions determine which question will be presented next. Once the user has traversed the decision tree, a query can be formulated based upon the user's answers.

Still, those skilled in the art will recognize that the methods disclosed herein with reference to FIG. 4 can be used for purposes of automatically assigning descriptors to data items of a data collection. For example, the aforementioned question can be presented to a user. If the user answers "yes", the presentation being developed can be associated with the descriptor dimensions of "business v. technology" and "mass users v. selected users." A dimension value of 1 can be associated with each descriptor dimension. Alternatively, additional questions can be presented to the user to determine the degree to which the presentation pertains to each subject of the descriptor dimensions. For example, the questions can ask the user to specify the relationship of the presentation to given subjects of a descriptor dimension, or how many times the presentation will be given to one or more different audiences. The different types of audiences specified in the query can indirectly represent the subjects of a given descriptor dimension. From the user's response, a single dimension value can be determined.

In another arrangement, users can be presented lists with check boxes to select relevant descriptors. Further, adjustable sliding scales can be provided for selecting dimension values. In yet another arrangement, text mining can be implemented to select key terms from a user answer that is not merely a yes/no answer. Nevertheless, there are a variety of ways in which questions can be presented to the user and user inputs can be received. Accordingly, the present invention is not limited to the various techniques disclosed herein.

User responses to the questions can be used to formulate search criteria specified within a query, as shown in step 420. In particular, a query specifying a plurality of descriptor dimensions and corresponding dimension values can be generated based upon user responses to questions. As mentioned, other query parameters specifying characteristic and history descriptors can be generated from the user responses. Referring to step 430, a search engine can search a data collection for data items having descriptors which conform to the query. In step 440, a list of data items which conform to the query can be returned. As mentioned, those skilled in the art will recognize that a process similar to the method of FIG. 4 can be used to assign descriptors to the data items of a data collection.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for data processing, comprising the steps of:

associating at least one descriptor dimension to data items of a collection, wherein said descriptor dimension represents a scale between a descriptor of said data items and at least one other descriptor of said data items;

assigning a dimension value to said descriptor dimension; and seaching said collection of data items to identify at least one of said data items based upon said dimension value;

wherein said descriptors each define at least one of a data topic, data usage, and data operational history, and wherein said dimension value provides a sequential ordering indicating relevancies on said scale of said data items relative to each of said descriptors.

2. The method of claim 1, further comprising:

determining said at least one descriptor dimension and dimension value by querying a user with a set of questions wherein said questions correlate to said descriptor dimensions and dimension values associated with said data items.

3. The method of claim 1, wherein said descriptors relate, respectively, to different potential uses of said data items.

4. The method of claim 1, wherein said descriptors relate to different classifications of said data items.

5. The method of claim 1, further comprising the step:

assigning a characteristic descriptor to at least one of said data items, wherein said characteristic descriptor specifies a function of said data items.

6. The method of claim 1, further comprising the step:

assigning a history descriptor to at least one of said data items.

7. The method of claim 6, wherein said history descriptor specifies a usage history.

8. The method of claim 6, wherein said history descriptor specifies a sharing history.

9. The method of claim 6, wherein said history descriptor specifies a replication history.

10. The method of claim 6, wherein said history descriptor specifies a modification history.

11. The method of claim 6, wherein said history descriptor specifies an owner of said data item.

12. The method of claim 6, wherein said descriptors are used by a search engine to select data items in response to a user query.

13. A computer-implemented method for searching a collection of data items, comprising the steps of:

querying a user with a set of questions wherein said questions correlate to descriptor dimensions and dimension values associated with said data items, said descriptor dimensions representing a scale between a descriptor of said data items and at least one other descriptor of said data items, said descriptors each defining at least one of a data topic, data usage, and data operational history, and said dimension values providing sequential orderings indicating relevancies on said scale of said data items relative to each of said data descriptors;

generating a query based upon user responses to said questions, said query specifying at least one descriptor dimension and associated dimension value for searching said collection of data items; and searching said collection of data items for particular ones of said data items conforming to said query.

14. The method of claim 13, wherein said generating step further comprises:

determining at least one of a history descriptor and a characteristic descriptor of said data items to be used in said query.

15. The method of claim 14, wherein said searching step further comprises:

searching said collection of data items using at least one of said history descriptor and said characteristic descriptor.

16. A machine-readable storage, having stored thereon a computer program having a plurality of code sections executable by a machine for causing the machine to perform the steps of:

associating at least one descriptor dimension to data items of a collection, wherein said descriptor dimension represents a scale between a descriptor of said data items and at least one other descriptor of said data items;

assigning a dimension value to said descriptor dimension; and searching said collection of data items to identify at least one of said data items based upon said dimension value;

wherein said descriptors each define at least one of a data topic, data usage, and data operational history, and wherein said dimension value provides a sequential ordering indicating relevancies on said scale of said data items relative to each of said descriptors.

17. The machine-readable storage of claim 16, further comprising:

determining said at least one descriptor dimension and dimension value by querying a user with a set of questions wherein said questions correlate to said descriptor dimensions and dimension values associated with said data items.

18. The machine readable storage of claim 16, wherein said descriptors relate, respectively, to different potential uses of said data items.

19. The machine readable storage of claim 16, wherein said descriptors relate to different classifications of said data items.

20. The machine readable storage of claim 16, further comprising the step:

assigning a characteristic descriptor to at least one of said data items, wherein said characteristic descriptor specifies a function of said data items.

21. The machine readable storage of claim 20, further comprising the step:

assigning a history descriptor to at least one of said data items.

22. The machine readable storage of claim 21, wherein said history descriptor specifies a usage history.

23. The machine readable storage of claim 21, wherein said history descriptor specifies a sharing history.

24. The machine readable storage of claim 21, wherein said history descriptor specifies a replication history.

25. The machine readable storage of claim 21, wherein said history descriptor specifies a modification history.

26. The machine readable storage of claim 21, wherein said history descriptor specifies an owner of said data item.

27. The machine readable storage of claim 21, wherein said descriptors are used by a search engine to select data items in response to a user query.

28. A machine-readable storage, having stored thereon a computer program having a plurality of code sections executable by a machine for causing the machine to perform the steps of:

querying a user with a set of questions wherein said questions correlate to descriptor dimensions and dimension values associated with said data items, said descriptor dimensions representing a scale between a descriptor of said data items and at least one other descriptor of said data items, said descriptors each defining at least one of a data topic, data usage, and data operational history, and said dimension values providing sequential orderings indicating relevancies on said scale of said data items relative to each of said data descriptors;

generating a query based upon user responses to said questions, said query specifying at least one descriptor dimension and associated dimension value for searching said collection of data items; and searching said collection of data items for particular ones of said data items conforming to said query.

29. The machine readable storage of claim 28, wherein said generating step further comprises:

determining at least one of a history descriptor and a characteristic descriptor of said data items to be used in said query.

30. The machine readable storage of claim 29, wherein said searching step further comprises:

searching said collection of data items using at least one of said history descriptor and said characteristic descriptor.

* * * * *